United States Patent
Ueda

(10) Patent No.: US 6,647,060 B1
(45) Date of Patent: Nov. 11, 2003

(54) VIDEO COMPRESSION DEVICE AND VIDEO COMPRESSION METHOD

(75) Inventor: Hiroaki Ueda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/312,887

(22) Filed: May 17, 1999

(30) Foreign Application Priority Data

May 28, 1998 (JP) ............................................. 10-147967

(51) Int. Cl.⁷ ................................................. H04N 7/12
(52) U.S. Cl. ............................ 375/240.02; 375/240.12; 375/240.13; 375/240.15
(58) Field of Search ..................... 375/240.02, 240.03, 375/240.04, 240.12, 240.13, 240.14, 240.15, 240.16; 348/407.1, 413.1, 416.1, 419.1; 382/236, 238, 232; 386/111, 109

(56) References Cited

U.S. PATENT DOCUMENTS

| | | | | |
|---|---|---|---|---|
| 5,832,121 A | * | 11/1998 | Ando | 382/236 |
| 5,905,535 A | * | 5/1999 | Kerdranvat | 348/416 |
| 5,959,672 A | * | 9/1999 | Sasaki | 375/240.23 |
| 6,011,589 A | * | 1/2000 | Matsuura et al. | 348/413 |
| 6,366,704 B1 | * | 4/2002 | Ribas-Corbera et al. | 382/239 |
| 6,570,922 B1 | * | 5/2003 | Wang et al. | 375/240.12 |

FOREIGN PATENT DOCUMENTS

| | | | | |
|---|---|---|---|---|
| JP | 5-260521 | 10/1993 | ............ | H04N/7/12 |
| JP | 5-268589 | 10/1993 | ............ | H04N/7/12 |
| JP | 6-178274 | 6/1994 | ............ | H04N/7/12 |
| JP | 8-336134 | 12/1996 | ............ | H04N/7/24 |
| JP | 9-130787 | 5/1997 | ............ | H04N/7/24 |
| JP | 10-28269 | 1/1998 | ............ | H04N/7/12 |
| JP | 10-42295 | 2/1998 | ............ | H04N/7/32 |

* cited by examiner

Primary Examiner—Vu Le
(74) Attorney, Agent, or Firm—Whitham, Curtis & Christofferson, P.C.

(57) ABSTRACT

A frame receiving unit calculates the number of a frame to be compressed and gets an image data from the frame. A frame checking unit checks the type of the frame and allocates required code memory. When the frame is an I frame, a frequency conversion unit converts the image to a spatial frequency, a quantization unit quantizes the spatial frequency, and a variable-length coding unit performs variable-length coding. At the same time, a reverse quantization unit performs reverse-quantization and a reverse frequency conversion unit performs reverse-conversion to create a reference image. When the frame is a P frame, a motion search unit searches for a motion of the image. The frequency conversion unit converts a difference between the image and the reference image to the spatial frequency, the quantization unit performs quantization, and the variable-length coding unit performs variable-length coding. At the same time, the reverse quantization unit performs reverse-quantization, the reverse frequency conversion unit performs reverse frequency conversion to return the reverse conversion result to the difference of the images, and a motion compensation unit combines the result with a motion-compensated reference image. When the frame is a B frame, a code indicating that the frame is the same as the reference frame is generated. The generated code is output to the allocated code memory.

8 Claims, 13 Drawing Sheets

FIG.5B
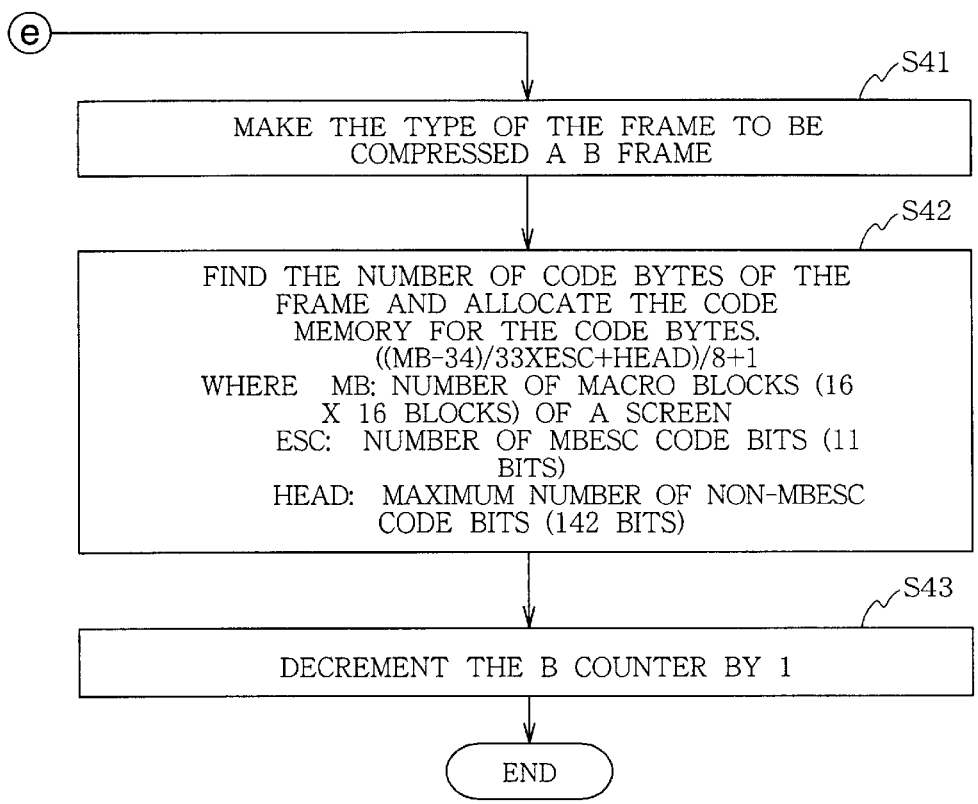
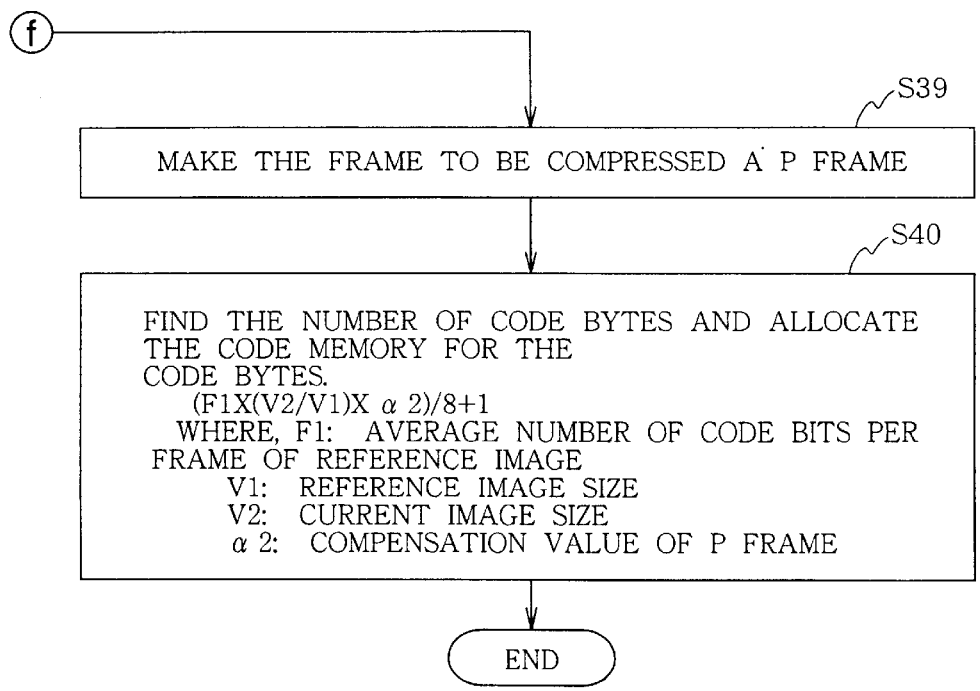

FIG. 8A

|  |  |  |
|---|---|---|
| PSC | 32bit | 00000100(H) |
| TR | 10bit | 1 |
| PCT | 3bit | 011 |
| VD | 18bit | 48000(D) |
| FPFV | 1bit | 0 |
| FFC | 3bit | 011 |
| FPBV | 1bit | 0 |
| BFC | 3bit | 011 |
| EBP | 1bit | 0 |

THIS IS GENERATED REGARDLESS OF THE IMAGE SIZE

|  |  |  |
|---|---|---|
| SSC | 32bit | 000001AF(H) |
| QS | 5bit | 16(D) |
| EBS | 1bit | 0 |

|  |  |  |
|---|---|---|
| MBAI | 1bit | 1 |
| MBTYPE | 4bit | 0010 |
| QS | 5bit | 0 |
| MHF | 1bit | 0 |
| MVF | 1bit | 0 |

|  |  |  |
|---|---|---|
| MB ESC | 11bit | 0000 0000 000 |
| MB ESC | 11bit | 0000 0001 000 |

THE NUMBER OF MB ESC OCCURRENCES DEPENDS ON THE IMAGE SIZE

|  |  |  |
|---|---|---|
| MBAI | 4bit | 13(D) |
| MBTYPE | 4bit | 0001 |
| QS | 5bit | 0 |
| MHF | 1bit | 0 |
| MVF | 1bit | 0 |

THE MBAI CODE DEPENDS ON THE IMAGE SIZE. THE MAXIMUM IS 11 BITS

|  |  |  |
|---|---|---|
| MBTYPE |  |  |
| MBQUANT | 1bit | 0 |
| MBFV | 1bit | 1 |
| MBBV | 1bit | 0 |
| MBP | 1bit | 0 |
| MBINTRA | 1bit | 0 |

FIG. 8B

| | |
|---|---|
| PSC | INDICATES THE START OF THE FRAME. |
| TR | FRAME SERIAL NUMBER (RESET FOR EACH GOP) |
| PCT | FRAME TYPE |
| VD | INITIAL BUFFER STATUS DURING RANDOM ACCESS |
| FPFV | FORWARD VECTOR PRECISION (FULL PIXEL/HALF PIXEL) |
| FFC | FORWARD VECTOR DESCRIPTION RANGE |
| FFBV | BACKWARD VECTOR PRECISION (FULL PIXEL/HALF PIXEL) |
| BFC | BACKWARD VECTOR DESCRIPTION RANGE |
| EBP | BIT INDICATING WHETHER EXTENDED INFORMATION IS PRESENT |
| SSC | INDICATES THE START OF A SLICE. |
| QS | VALUE USED FOR QUANTIZATION |
| EBS | BIT INDICATING WHETHER EXTENDED INFORMATION IS PRESENT |
| MBAI | INDICATES THE NUMBER OF MBS TO BE SKIPPED |
| MBTYPE | INDICATES THE CODING TYPE OF MACRO BLOCK (MB). |
| MHF | INDICATES THE DIFFERENCE BETWEEN THE HORIZONTAL COMPONENT OF THE FORWARD VECTOR OF THE MB AND THAT OF THE FORWARD VECTOR OF THE PRECEDING MB |
| MVF | INDICATES THE DIFFERENCE BETWEEN THE VERTICAL COMPONENT OF THE FORWARD VECTOR OF THE MB AND THAT OF THE FORWARD VECTOR OF THE PRECEDING MB |
| MS ESC | SKIPS 33 MBS |

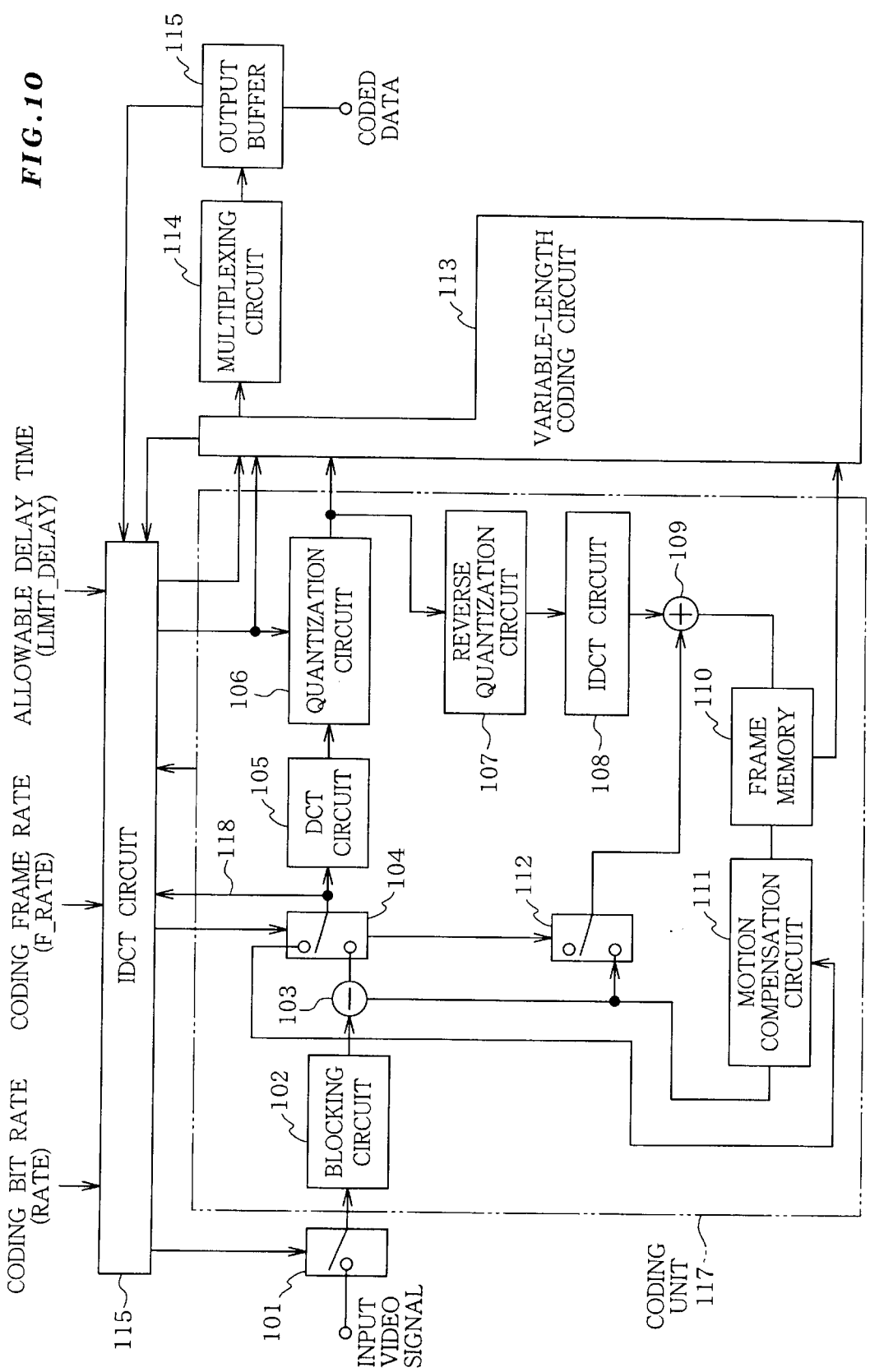

VIDEO COMPRESSION DEVICE AND VIDEO COMPRESSION METHOD

BACKGROUND OF THE INVENTION

1. Field of the Invention

The present invention relates to a video compression device compressing video images, and more particularly to a video compression device and a video compression method allowing video data to be transmitted at an optimum frame rate in accordance with the input frame rate of original images, such as MPEG1-compressed video, and a user-specified compression level.

2. Description of the Related Art

Digitized images recorded on recording media, such as CD-ROM discs or hard disks, are usually compressed because they take up a huge amount of space. There are many compression methods. In many cases, the DCT-based coding method is used. It takes advantage of the characteristics that the spatial frequencies of an image concentrate on low frequencies. This coding method is adopted as the international standard coding methods such as JPEG (Joint Photographic Expert Group) or MPEG (Moving Pictures Expert Group) 1 and 2.

These storage types of video compression methods, such as MPEG1, use a predetermined number of frames per unit time. Therefore, when the frame rate of the input image is lower than that of MPEG1, the same frame must be inserted more than once. This generates redundant frames, thus decreasing compression efficiency. On the other hand, the international standard MPEG1 coding method cannot increase the compression rate by reducing the frame rate.

The "video signal coding method and video signal coding unit", disclosed in Japanese Patent Laid-Open Application No. Hei 10-42295, is designed to reduce the amount of redundant frames. To reduce the coding amount of frames, the unit and method disclosed in this publication generate a code indicating that a frame generated during inter-frame compression is a copy of some other frame, as shown in FIG. 9.

That is, to reduce the virtual frame rate while satisfy the frame rate defined by MPEG, the unit described in the above publication has a copy stream generator 49 generating a copy-word bit stream (copy system) indicating that a picture is the same as another already-copied picture. A system controller 45 does not perform movement compensation for B pictures or P pictures to be deleted; instead, the system controller 45 supplies a code-word bit stream (copy stream) 49a, output from the copy stream generator 49, to a buffer 37 via an output data switching switch 46 which constitutes a code multiplexer. Periodically inserting the code-word bit stream created by simply copying the preceding or following frame makes a frame rate lower than the normal frame rate.

On the other hand; the "video image coding unit", disclosed in Japanese Patent Publication (unexamined) No. A-9-130787, controls a switch 101, as instructed by a control signal from the coding control circuit for frame processing, as shown in FIG. 10. This unit selects frames to be skipped according to the actual amount of coding to adjust the frame rate.

That is, to implement a coding frame rate in accordance with the picture quality and to cause a little delay, the unit disclosed in this publication comprises a coding unit 117 which codes input video signals, an output buffer 115 which receives data coded by the coding unit 117 and outputs the coded data at a predetermined rate, and a coding control circuit 116 which selects frames to be coded. The coding control circuit 116 calculates the target amount of coding for each frame based on the externally-set coding bit rate, coding frame rate, and allowable delay time. It them compares the calculated value with the actual value, controls a quantization circuit 106 and the switch 101, and adjusts the quantization parameters and the number of frames to be skipped.

However, on the "video signal coding method and video signal coding unit" disclosed in Japanese Patent Publication (unexamined) No. A-10-42295, the frequency at which code indicating that a frame is a copy of some other frame is generated does not always match the input frame rate or the user-desired virtual output frame rate. This means that processing all input image data decreases efficiency.

On the "video image coding unit" disclosed in Japanese Patent Publication (unexamined) A-9-130787, the frame rate depends on the amount of coding, preventing some images from moving smoothly.

SUMMARY OF THE INVENTION

The present invention seeks to solve the problems associated with prior arts described in the above publications. It is an object of the present invention to provide a video compression device and a video compression method which provide efficiently-compressed and smoothly-moving video.

When the frame rate of the input image differs from a desired frame rate on a compressed video storage device, the present invention enables the user to generate the optimum frame configuration so that video may be compressed efficiently and to delete or insert frames according to the configuration while using as much input frames as possible.

The present invention provides a video compression device compressing video signals, comprising:

a frame receiving unit receiving the video signals, one frame at a time;

a frame checking unit checking a type of the frame to be processed and passing control to an appropriate unit;

a motion search unit searching a small block for a motion of an image;

a frequency conversion unit converting the image of the small block to a spatial frequency;

a quantization unit performing quantization for the image signals frequency-converted by the frequency conversion unit;

a reverse quantization unit performing reverse quantization for the signals output from the quantization unit;

a reverse frequency conversion unit performing reverse frequency conversion for the signals output from the reverse quantization unit;

a motion compensation unit compensating a motion of the image of the small block and generating an original image; and a variable-length coding unit performing variable-length coding for the signals output from the quantization unit and outputting the signals to a compressed code output unit.

In addition, the present invention provides a video compression method of compressing video signals, the method being processed by a frame receiving unit receiving the video signals, one frame at a time; a frame checking unit checking a type of the frame to be processed and passing control to an appropriate unit; a motion search unit searching a small block for a motion of an image; a frequency conversion unit converting the image of the small block to a spatial frequency; a quantization unit performing quantization for the image signals frequency-converted by the frequency conversion unit; a reverse quantization unit performing reverse quantization for the signals output from the quantization unit; a reverse frequency conversion unit performing reverse frequency conversion for the signals output from the reverse quantization unit; a motion compensation unit compensating a motion of the image of the small block and generating an original image; and a variable-length coding unit performing variable-length coding for the signals output from the quantization unit and outputting the signals to a compressed code output unit, the method comprising the steps of:

identifying the type of the frame by the frame checking unit that the frame is an I frame, P frame, or B frame;

passing control to the frequency conversion unit if the frame is the I frame;

passing control to the motion search unit if the frame is the P frame; and passing control directly to the compressed code output unit if the frame is the B frame.

The present invention also provides a video compression method according to the above-described method, further comprising the steps of:

getting a frame rate of the input video image;

getting a user-specified compression level;

if the input frame rate is smaller than a predetermined maximum output frame rate, changing the predetermined maximum output frame rate to the input frame rate;

calculating an effective frame rate according to:

formula: $(Level-1) \times (Max-Min)/(Size-1) + Min$;

where, Level: User-specified compression level (an integer equal to or larger than 1);
    Max: Maximum effective compression frame rate;
    Min: Minimum effective compression frame rate; and
    Size: Maximum compression level;

selecting an output frame rate with a least common multiple with the effective frame rate from the output frame rates 23.976, 24, 25, 29.97, and 30; and outputting the image data to the compressed code output unit by calculating a frame number of the image to be compressed (beginning with 0) using the input frame rate and the output frame rate according to:

formula: $N \times R1/R2$;

where, N: number of compressed frames compressed so far (integer value 0 or larger);
    R1: Input frame rate; and
    R2: output frame rate.

The present invention also provides a video compression method according to the above-described method, further comprising the steps of:

finding a number of compressed frames output to the compressed code output unit;

getting the effective frame rate;

getting the output frame rate;

checking if a count (initial of 0) of the B frames is larger than 0;

if the count is not larger than 0, calculating the number of the B frames to be used next according to:

formula: $(K \times R1/R2) - N - 1$;

where, N: number of frames compressed so far;
    K: number of calculations (beginning with 1);
    R1: output frame rate; and
    R2: effective frame rate;
    storing the number of the B frames;
    checking if the number of compressed frames is a multiple of the output frame rate;
    if so:
        making the frame to be compressed an I frame;
    finding the number of code bytes according to:

formula: $(F1 \times (V2/V1) \times \alpha 1)/8 + 1$ where F1: average number of code bits per frame of a reference image;
    V1: reference image size;
    V2: current image size; and
    $\alpha 1$: compensation value of I frame; and
    allocating code memory for the code bytes; and
    if not:
        making the frame to be compressed a P frame;
    finding the number of code bytes according to:

$(F1 \times (V2/V1) \times \alpha 2)/8 + 1$     formula where, F1: average number of code bits per frame of the reference image;
    V1: reference image size;
    V2: current image size; and
    $\alpha 2$: Compensation value of P frame; and
    allocating the code memory for the code bytes; and
    if the count is larger than 0, making the type of the frame to be compressed a B frame;
    finding the number of code bytes according to:

formula: $((MB-34)/33 \times ESC + HEAD)/8 + 1$ where MB: Number of macro blocks (16×16 blocks) of a screen;
    ESC: Number of MBESC code bits (11 bits); and
    HEAD: Maximum number of non-MBESC code bits (142 bits); and
    allocating the code memory for the code bytes.

The present invention also provides a computer program product stored on a storage medium for controlling a video compressing device comprising a frame receiving unit receiving the video signals, one frame at a time; a frame checking unit checking a type of the frame to be processed and passing control to an appropriate unit; a motion search unit searching a small block for a motion of an image; a frequency conversion unit converting the image of the small block to a spatial frequency; a quantization unit performing quantization for the image signals frequency-converted by the frequency conversion unit; a reverse quantization unit performing reverse quantization for the signals output from the quantization unit; a reverse frequency conversion unit performing reverse frequency conversion for the signals output from the reverse quantization unit; a motion compensation unit compensating a motion of the image of the small block and generating an original image; and a variable-length coding unit performing variable-length coding for the signals output from the quantization unit and outputting the signals to a compressed code output unit, wherein the program causes the video compression device to:

identify the type of the frame by the frame checking unit that the frame is an I frame, P frame, or B frame;

pass control to the frequency conversion unit if the frame is the I frame;

pass control to the motion search unit if the frame is the P frame; and pass control directly to the compressed code output unit if the frame is the B frame.

More specifically, the frame receiving unit 11 shown in FIG. 2 deletes or inserts a received image, one frame at a time, so that the optimum output frame rate calculated from the input frame rate of the original image and the user-specified compression level may be obtained. The frame checking unit 12 checks the current frame type. An I frame and a P frame are compressed as usual, while a B frame is not actually compressed. For the B frame, a code indicating that the frame is the same as the reference frame is inserted.

BRIEF DESCRIPTION OF THE DRAWINGS

FIG. 5A and 5B are a flowchart showing the operation of the video compression method used in the embodiment of the present invention.

FIGS. 8A and 8B are an example of a program of the video compression method used in the embodiment of the present invention.

FIG. 10 is a block diagram showing the video compression method according to the prior art.

DESCRIPTION OF THE PREFERRED EMBODIMENTS.

The present invention will be described in detail by referring to the attached drawings.

Configuration of the Embodiment

Figure 1:
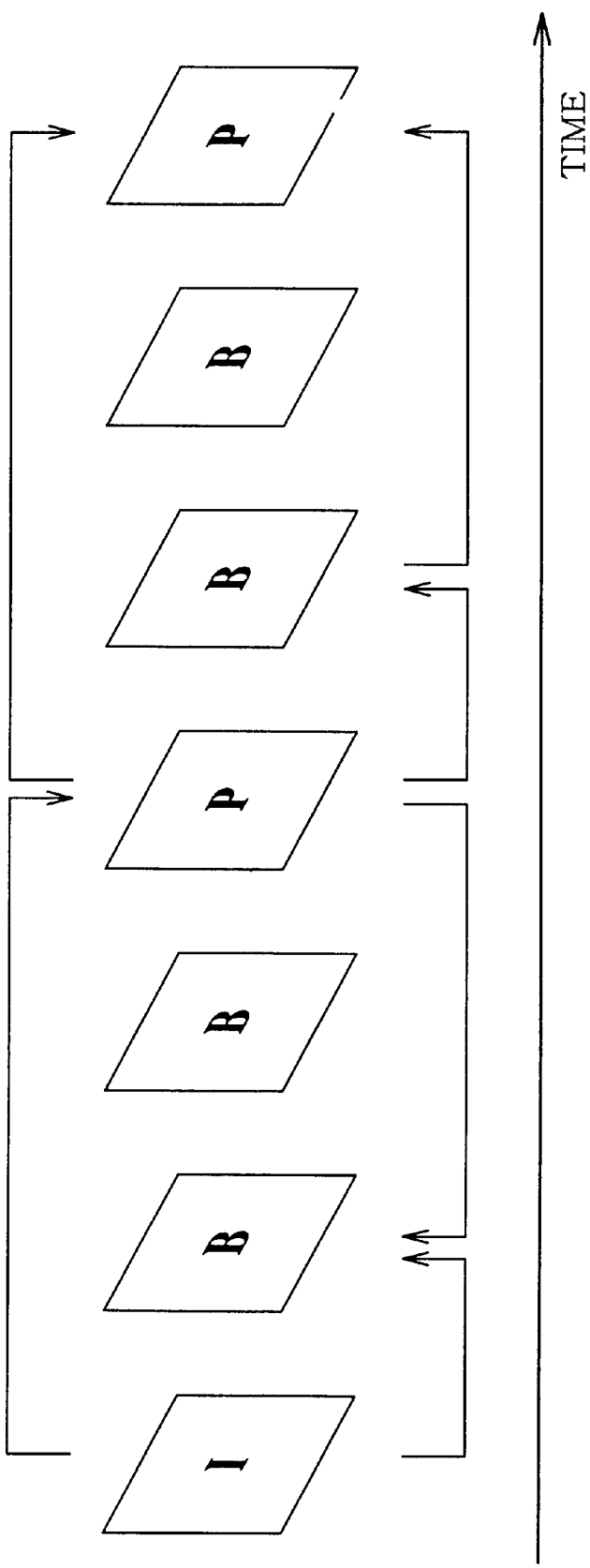
FIG. 1 is a diagram showing the concept of frame configuration according to the standard video compression method.

Referring to FIG. 1, a compression method, such as Moving Picture Experts Group (MPEG) 1, in which the number of frames per unit time is defined will be described. FIG. 1 shows the configuration of frames. There are three types of frames: Intra-coded frame (I frame), Predictive-coded frame (P frame), and bidirection predictive-coded frame (B frame). The I frame is compressed without using a reference frame, while the P frame is compressed using the preceding I frame or P frame. The B frame is compressed by referencing the preceding or following I frame. The B frame is not referenced as a reference frame. Because the number of frames per unit time is defined by MPEG1, compression is performed for all frames. However, the B frame data may be treated as if it was the reference frame image. Thus, the amount of data after compression becomes much smaller.

Figure 2:
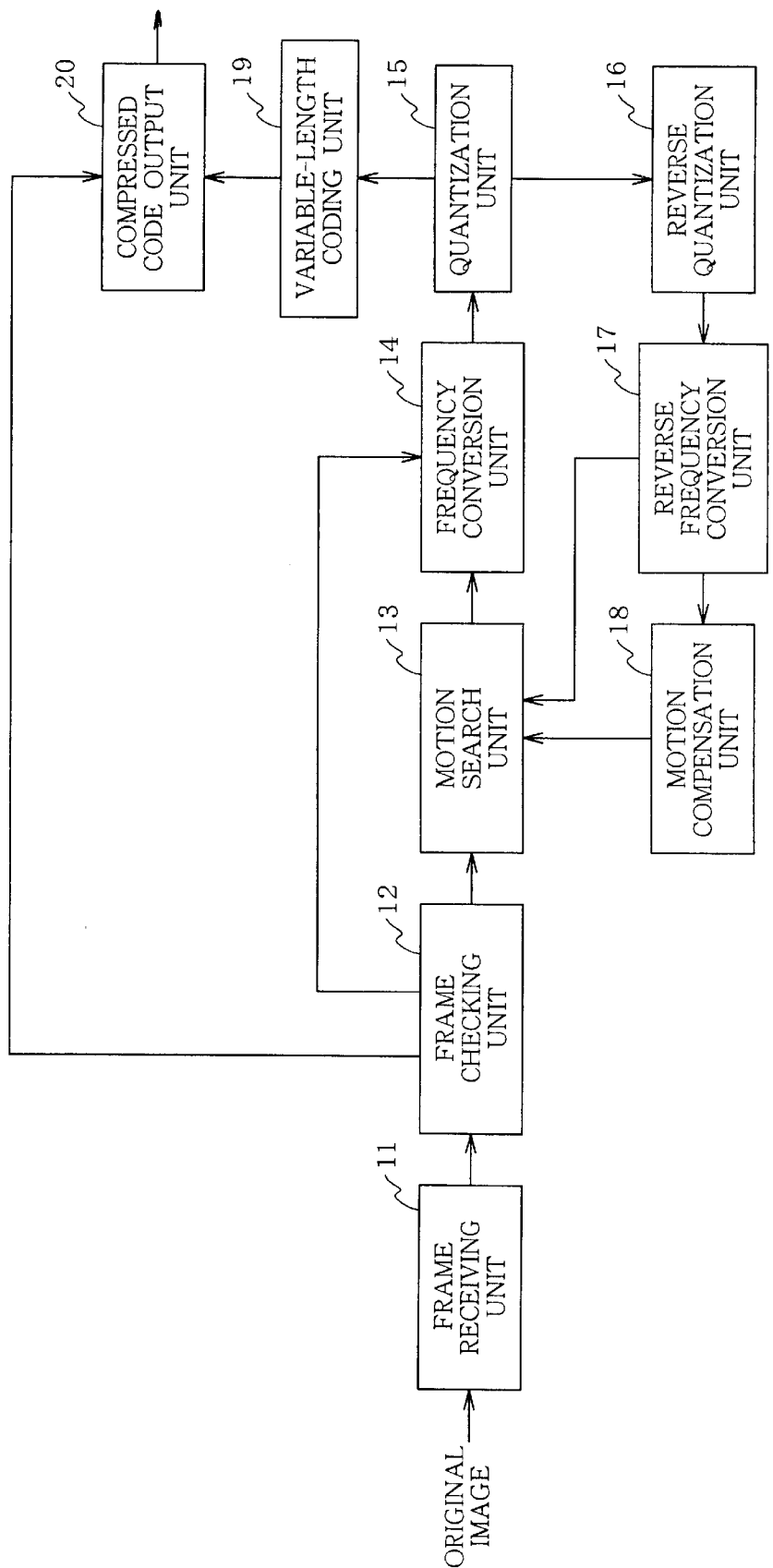
FIG. 2 is a block diagram showing the configuration of a video compression method of an embodiment of the present invention.

FIG. 2 shows the configuration of an embodiment of the video compression device according to the present invention. As shown in FIG. 2, the video compression device comprises the following units: a frame receiving unit 11, a frame checking unit 12, a motion search unit 13, a frequency conversion unit 14, a quantization unit 15, a reverse quantization unit 16, a reverse frequency conversion unit 17, a motion compensation unit 18, a variable-length coding unit 19, and a compressed code output unit 20. The frame receiving unit 11 deletes or inserts frames in accordance with the output frame rate. The frame checking unit 12 checks the type of a frame to be processed and passes control to an appropriate unit. When the frame is a B frame, the frame checking unit 12 passes control to the compressed code output unit 20. The motion retrieval unit 13 searches for image motions in a small block, and the frequency conversion unit 14 converts the image of a small block to a spatial frequency. The quantization unit 15 performs quantization, while the reverse quantization unit 16 performs the reverse of quantization. The reverse frequency conversion unit 17 performs the reverse of frequency conversion. The motion compensation unit 18 compensates for the motion of the image of a small block. The variable-length coding unit 19 performs variable-length conversion. The compressed code output unit 20 outputs the compressed code output of the variable-length coding unit 19 for storage, for example, on a magnetic tape, magneto-optical disk, CD-ROM, DVD-ROM, and DVD-RAM.

The following describes how these units perform operations. The frame receiving unit 11 deletes or inserts images, received one frame at a time, so that the output frame rate becomes the optimum frame rate calculated from the input frame rate of the original image and the compression level specified by the user. The frame checking unit 12 checks the image, received one frame at a time, if it is an I frame, P frame, or B frame, allocates required code memory, and compresses each frame according to the frame type. The frame checking unit 12 also contains the B counter counting the number of B frames.

When the frame is an I frame, it is divided into a plurality of small blocks. The frequency conversion unit 14 converts each block to a spatial frequency, the quantization unit 15 quantizes the spatial frequency, and the variable-length coding unit 19 performs variable-length coding for the quantized result to output compressed code. At the same time, the reverse quantization unit 16 reverse-quantizes the quantized block, and the reverse frequency conversion unit 17 performs the reverse frequency conversion to create a reference frame.

When the frame is a P frame, it is divided into a plurality of small blocks. For each block, the motion search unit 13 searches the blocks of the preceding frame, stored as the reference frame, for the highest-correlation block. The frequency conversion unit 14 converts the difference between the block and the highest-correlation block in the preceding frame into a spatial frequency, the quantization unit 15 quantizes the spatial frequency, and the variable-length coding unit 19 performs variable-length coding for output of compressed code. At the same time, the reverse quantization unit 16 reverse-quantizes the quantized block. The reverse frequency conversion unit 17 performs reverse frequency conversion for the reverse-quantized block, and the motion compensation unit 18 combines the block with the motion-compensated block to create a reference frame.

When the frame is a B frame, the input image is ignored. The image is not compressed but a code indicating that the frame is the same as the reference frame is inserted.

Operation of the Embodiment

Next, referring to FIG. 3A and 3B, the general operation of the embodiment will be described more in detail.

Figure 3A:
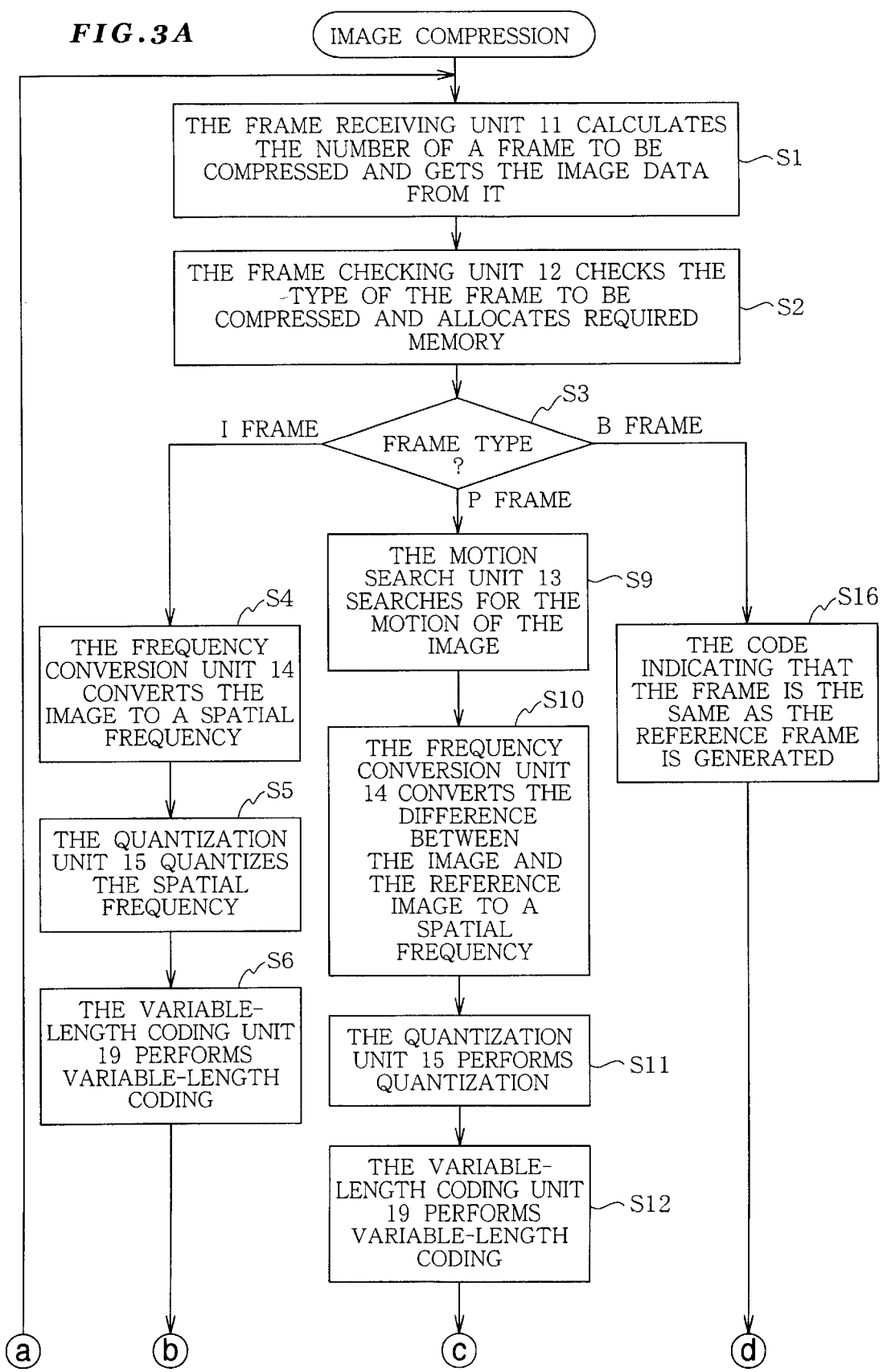
FIG. 3A and 3B are a flowchart showing the operation of the video compression method used in the embodiment of the present invention.
Figure 3B:
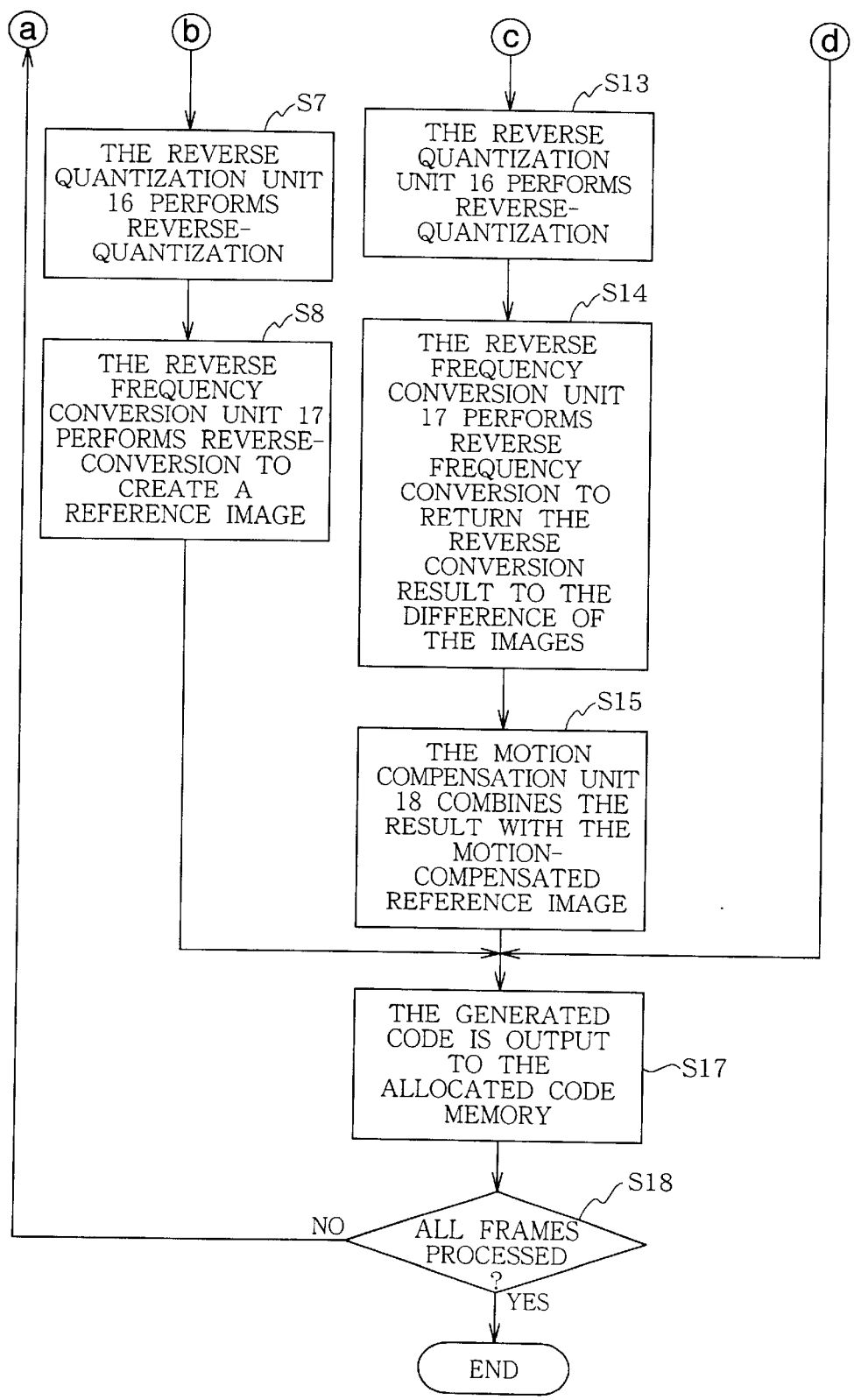

As shown in FIG. 3A and 3B, the frame receiving unit 11 calculates the number of a frame to be compressed and gets the image data from it (S1). The frame checking unit 12 checks the type of the frame to be compressed, allocates required memory (S2), and finds the frame type (S3). When the frame is an I frame, the frequency conversion unit 14 converts the image to a spatial frequency (S4), the quantization unit 15 quantizes the spatial frequency (S5), and the variable-length coding unit 19 performs variable-length coding to produce compressed code (S6). At the same time, the reverse quantization unit 16 performs reverse-quantization (S7), and reverse frequency conversion unit 17 performs reverse-conversion to create a reference image (S8).

When the frame is a P frame, the quantization unit 15 searches for the motion of the image (S9), the frequency conversion unit 14 converts the difference between the frame and the reference image to a spatial frequency (S10), the quantization unit 15 performs quantization (S11), and the variable-length coding unit 19 performs variable-length coding to produce compressed code (S12). At the same time, the reverse quantization unit 16 performs reverse-quantization (S13), the reverse frequency conversion unit 17 performs reverse frequency conversion to return the reverse conversion result to the difference of the images (S14), and the motion compensation unit 18 combines the result with the motion-compensated reference image (S15).

When the frame is a B frame, the code indicating that the frame is the same as the reference frame is generated.

Then, the generated code is output to the allocated code memory (S17). A check is made to see if all the frames have been processed (S18). If not, control is passed back to S1; if all the frames are processed, processing ends. Note that the code memory is where the output from the variable-length coding unit 19 is stored. Instead of using this code memory, the output from the compressed code output unit 20 may be output, via a transmission line or a wireless transmission line, to decoding means for decoding.

Figure 4:
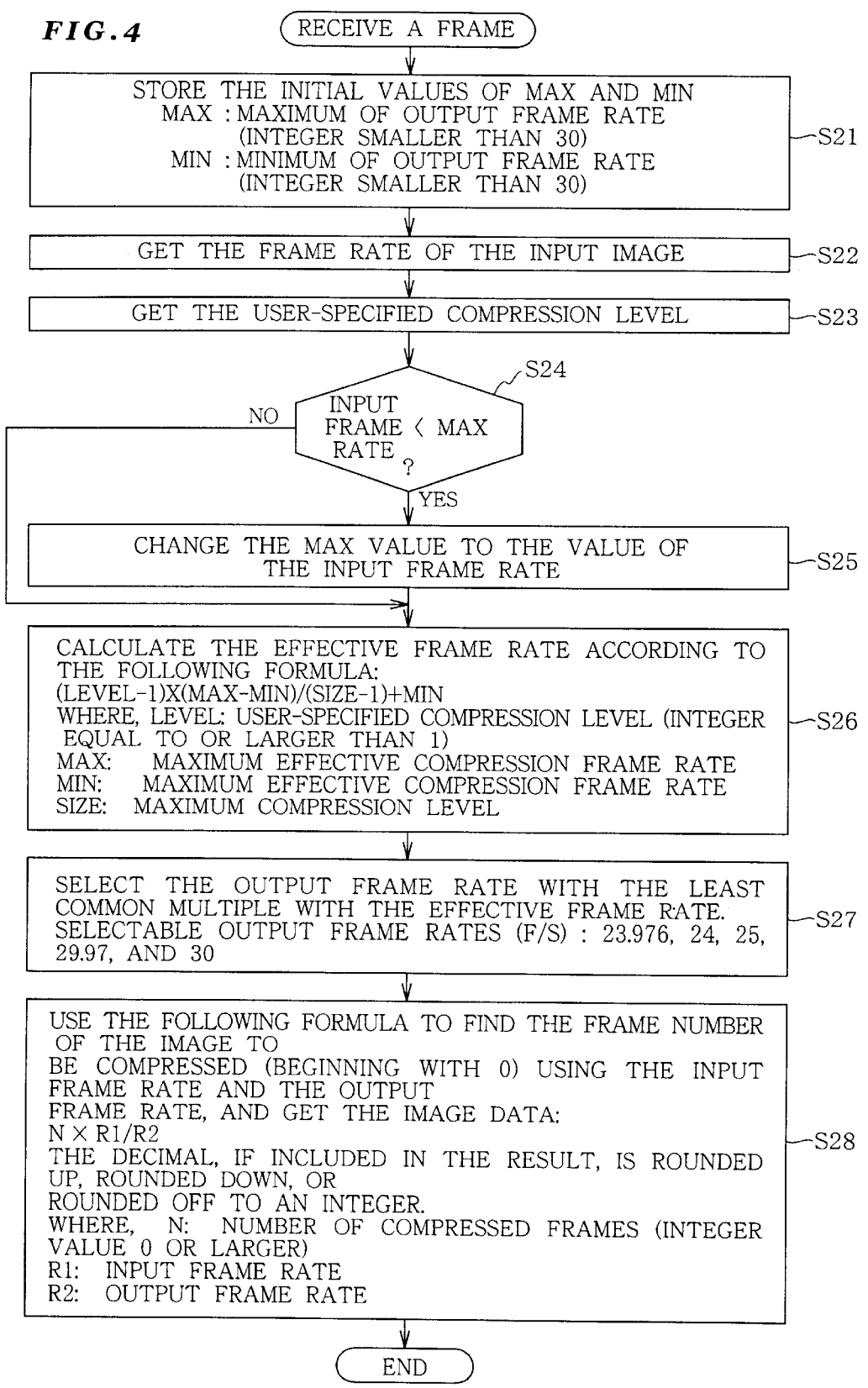
FIG. 4 is a flowchart showing the operation of the video compression method used in the embodiment of the present invention.

FIG. 4 is a flowchart showing how a frame is inserted or deleted. As shown in FIG. 4, the video compression device first stores the initial values of the maximum output frame rate Max and the minimum output from rate Min (S21) that are predetermined. Max and Min, which depend on the performance of the video compression device, are integers smaller than 30. Then, the unit gets the frame rate of the input image (S22), gets the user-specified compression level (S23), and checks if the input frame rate is smaller than Max (S24). If the input frame is smaller than Max, the unit changes the Max value to the value of the input frame rate (S25).

Then, the unit calculates the effective frame rate according to the following formula (S26):

$$(\text{Level}-1) \times (\text{Max}-\text{Min})/(\text{Size}-1) + \text{Min} \qquad \text{Formula}$$

where, Level: User-specified compression level (integer equal to or larger than 1)

Max: Maximum effective compression frame rate

Min: Minimum effective compression frame rate

Size: Maximum compression level

For example, when Max=15, Min=2, Lavel=3, and Size=5, the effective frame rate is calculated as $(3-1)\times(15-2)/(5-1)+2=8.5$. Thus, the effective frame rate is 8 frames (f)/s.

Instead of calculating the effective frame rate using the formula given above, the user may check the frame rate of the image to directly specify the effective frame rate within the range.

Next, the unit finds the multiples common to the effective frame rate and the output frame rate and selects the output frame rate with the least common multiple (S27). The selectable output frame rates are 23.976, 24, 25, 29.97, and 30. The unit selects from these rates. For example, when the effective frame rate is 8, the unit selects the output frame rate of 24. To simplify processing, the output frame rate of 24 which has most divisors may always be used.

Next, the unit uses the following formula to find the frame number of the image to be compressed (beginning with 0) using the input frame rate and the output frame rate, and then gets the image data of the frame (S28).

$$N \times R1/R2 \qquad \text{Formula}$$

The decimal, if included in the result, is rounded up, rounded down, or rounded off to an integer.

Where, N: Number of frames compressed so far (integer value 0 or larger)

R1: Input frame rate

R2: output frame rate

For example, when N=6, R1=15, and R2=24, the result is $6 \times 15/24 = 3.75$. The result is round off to 4. Thus, the unit gets the fourth frame beginning with frame 0.

Figure 5A:
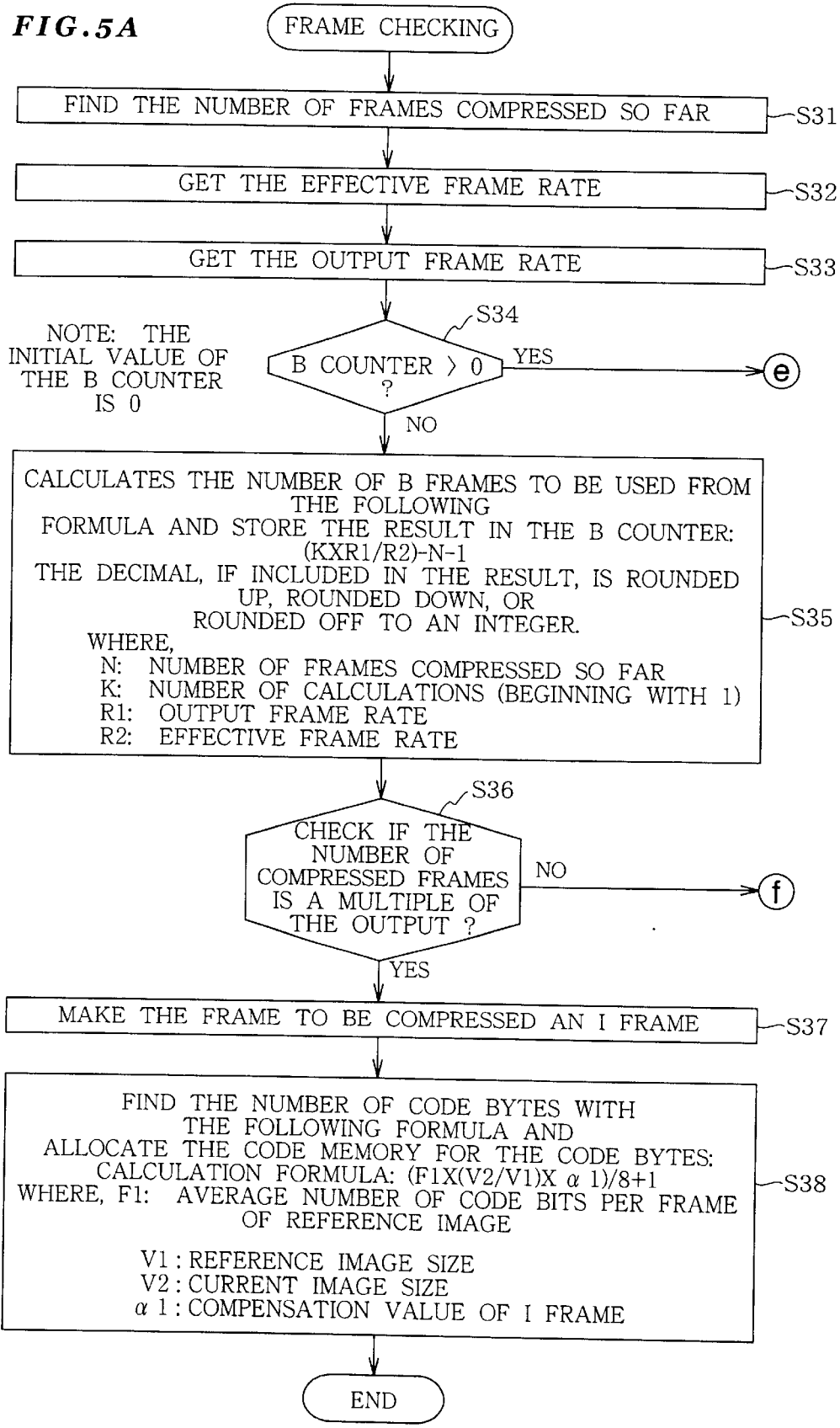

FIG. 5A and 5B are a flowchart showing how the unit checks the frame type and allocates memory required for coding. Referring to FIG. 5, the unit first finds the number of frames compressed so far (S31), gets the effective frame rate (S32), and gets the output frame rate (S33). Then, the unit checks if the value of the B counter (the initial value is 0) is larger than 0 (S34). If it is not, the unit calculates the number of B frames to be used from the following formula and stores the result in the B counter (S35).

$$(K \times R1/R2) - N - 1 \qquad \text{Calculation formula}$$

The decimal, if included in the result, is rounded up, rounded down, or rounded off to an integer.

Where, N: Number of frames compressed so far

K: Number of calculations (beginning with 1)

R1: Output frame rate

R2: Effective frame rate

For example, when N=4, K=3, R1=24, and R2=12, the result is $(3 \times 24/12) - 4 - 1 = 1$. Thus, the number of B frames is 1.

Then, the unit checks if the number of compressed frames is a multiple of the output frame rate (S36). If so, the unit makes the frame to be compressed an I frame (S37), finds the number of code bytes with the following formula, and allocates the code memory for the code bytes (S38).

$$(F1 \times (V2/V1) \times \alpha 1)/8 + 1 \qquad \text{Calculation formula}$$

Where, F1: Average number of code bits per frame of reference image

V1: Reference image size

V2: Current image size $\alpha 1$: Compensation value of I frame

For example, when F1=16000, V1=176×144=25344, V2=320×240=76800, and α1=1.6, the result is (16000×(76800/25344)×1.6)/8+1=9697.96. The decimal is rounded down. The 9697 bytes of code memory is required.

If the number of compressed frames is not a multiple of the output frame rate, the unit makes the frame to be compressed a P frame (S39) and finds the number of code bytes to allocate the code memory for the code bytes (S40).

$$(F1 \times (V2/V1) \times \alpha 2)/8+1 \qquad \text{Calculation formula}$$

Where, F1: Average number of code bits per frame of reference image

V1: Reference image size

V2: Current image size

α2: Compensation value of P frame

For example, when F1=16000, V1=176×144=25344, V2=320×240=76800, and α1=1.2, the result is (16000×(76800/25344)×1.2)/8+1=7273.72. The decimal is rounded down. The 7273 bytes of code memory is required.

If the value of the B counter is 0 or larger, the unit makes the type of the frame to be compressed a B frame (S41), finds the number of code bytes, and allocate code memory for the code bytes (S42).

$$((MB-34)/33 \times ESC + HEAD)/8+1 \qquad \text{Calculation formula}$$

Where MB: Number of macro blocks (16×16 blocks) of a screen

ESC: Number of MB ESC code bits (11 bits)

HEAD: Maximum number of code bits other than MB ESC (142 bits)

For example, because the number of macro blocks for a 320×240 image is (320/16)×(240/16)=300, the result is ((300−34)/33×11+142)/8+1=29.83. The decimal is rounded down. The 29 bytes of code memory is required.

FIGS. 8A and 8B show an example of code indicating that the frame is the same as the reference frame.

Then, the unit decrements the B counter by 1 (S43).

Although the unit always gets the image data of a compressed frame in the processing shown in FIG. 4, the processing shown in FIG. 5 may be performed before the processing shown in FIG. 4. In this case, when the frame is a B frame, the unit may omit the step of getting the image data.

The following describes an example.

Figure 6:
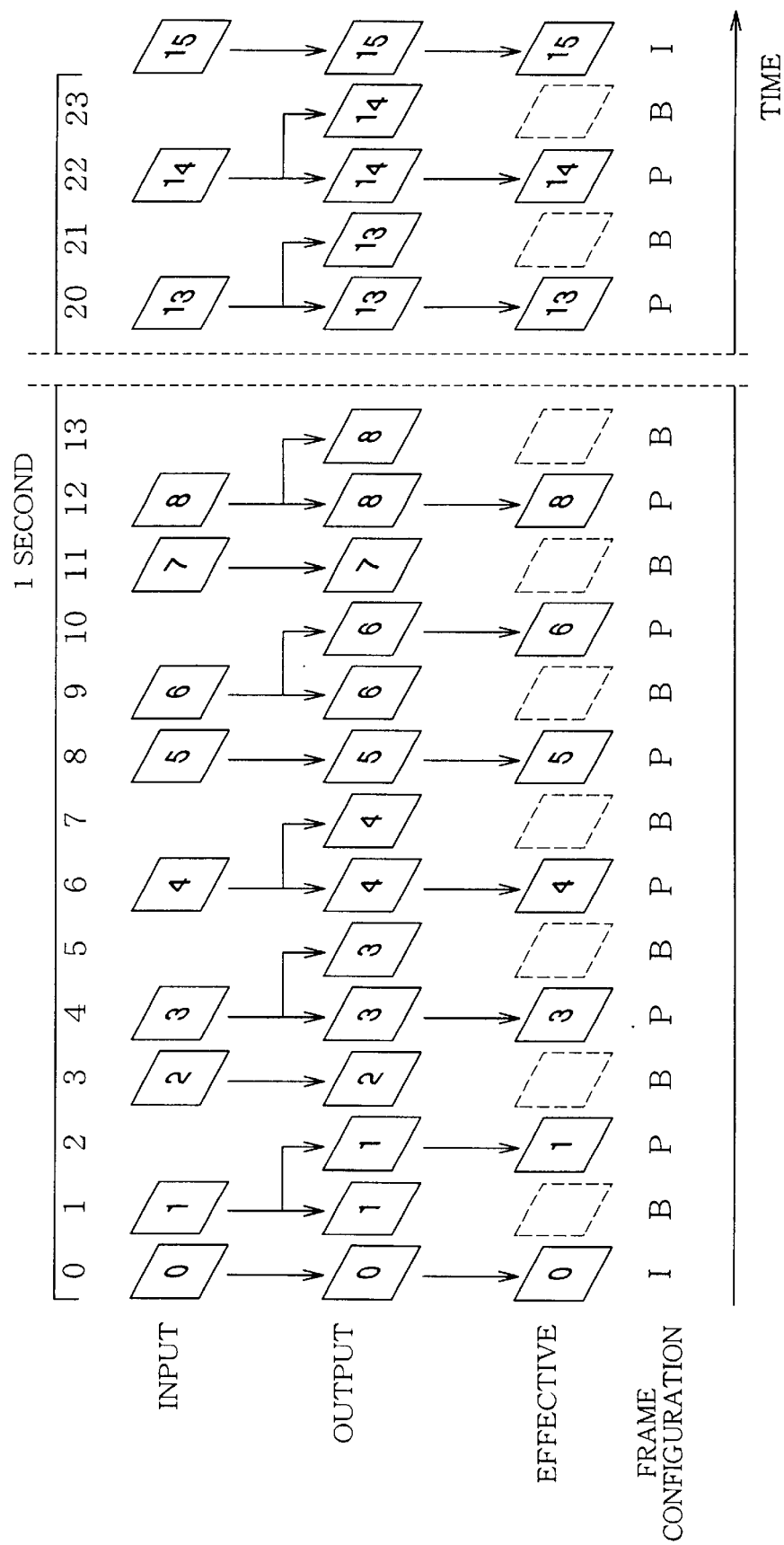
FIG. 6 is a diagram showing the concept of frames of the video compression method used in the embodiment of the present invention.

FIG. 6 is a diagram showing the operation of frame insertion and frame deletion. In the example shown in FIG. 6, the frame rate of the input image is 15 frames/s, the output frame rate of the compressed code is 24 frames/s, and the effective frame rate is 12 frames/s. More specifically, the number of frame to be compressed (beginning with 0) is determined using the formula shown below.

$$N \times R1/R2 \qquad \text{Calculation formula}$$

Where, N: Number of frames compressed so far

R1: Input frame rate

R2: Output frame rate

The integer obtained by rounding up, rounding down, or rounding off the decimal of the result is the frame number of the image to be compressed. If this value is equal to the preceding one, the frame is inserted; If it is two or more larger than the preceding one, the frame is not inserted.

In the example shown in FIG. 6, when N=0, the result is 0×15/24=0. Therefore, the number of frame to be compressed for count 0 is 0. When N=1, the result 1×15/24=0.625 is rounded off to 1. Therefore, the number of frame to be compressed for count 1 is 1. When N=2, the result 2×15/24=1.25 is rounded off to 1. Therefore, the number of frame to be compressed for count 2 is 1. The same calculation is repeated thereafter to determine the number of frame to be compressed.

Figure 7:
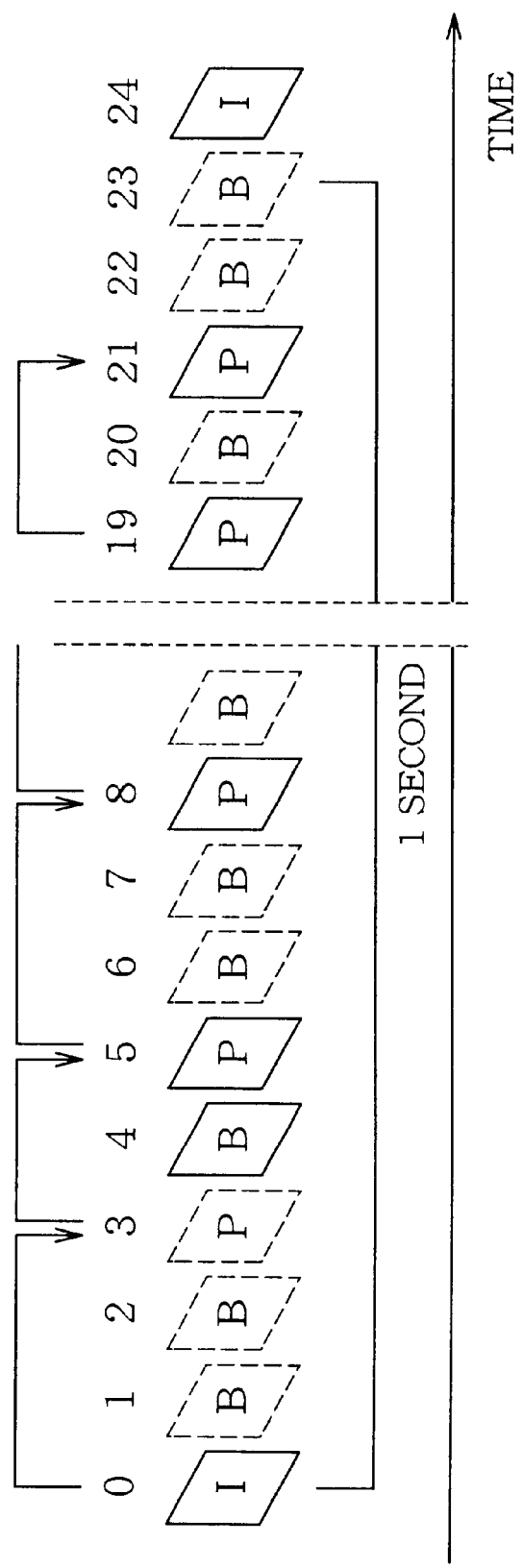
FIG. 7 is a diagram showing the concept of frames of the video compression method used in the embodiment of the present invention.
Figure 9:
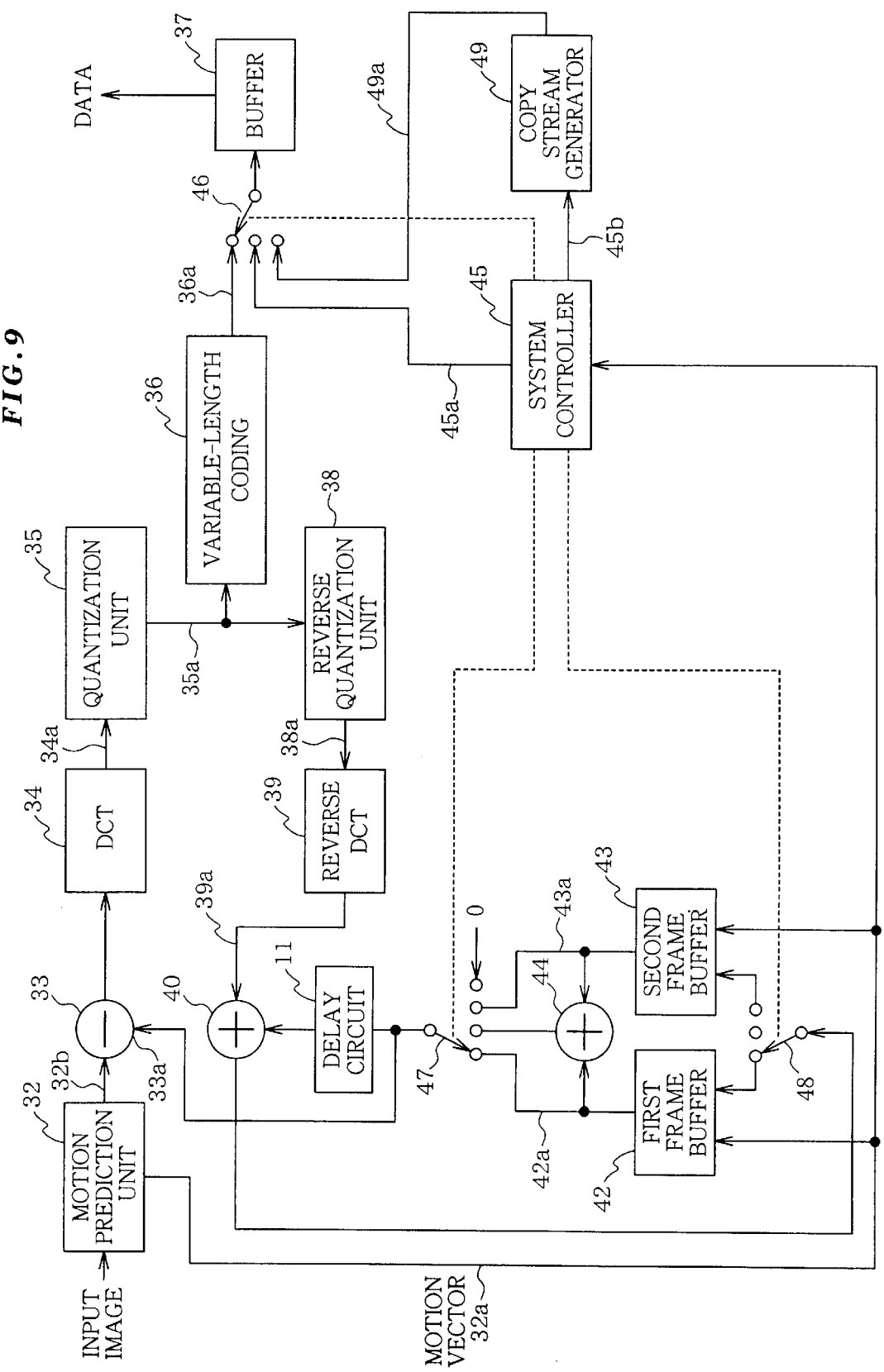
FIG. 9 is a block diagram showing the video compression method according to the prior art.

FIG. 7 is a diagram showing the configuration of frames. In the example shown in FIG. 7, the output frame rate is 24 frames/s and the effective frame rate is 9 frames/s. More specifically, the following formula is used to distribute the I frames and P frames evenly.

$$N \times R1/R2 \qquad \text{Formula}$$

Where, N: Number of frames compressed so far

R1: Output frame rate

R2: Effective frame rate

The decimal of the result is rounded up, rounded down, or rounded off, and the resulting integer is the number of an I frame or a P frame. If the integer is a multiple of output frames, the frame number is that of an I frame; otherwise, the frame number is that of a P frame.

Several output frame rates are available for use with MPEG1: 23.976 frames/s, 24 frames/s, 25 frames/s, 29.97 frames/s, and 30 frames/s. High compression efficiency requires a reduction in the number of B frames. To do so, the output frame rate with a least common multiple with the effective frame rate should be selected. That is, when the effective frame rate is 2 frames/s, 3 frames/s, 4 frames/s, 6 frame rates/s, 8 frame rates/s, and 12 frames/s, the output frame rate of 24 frames/s should be selected. When the effective frame rate is 5 frames/s, the output frame rate of 25 frames/s should be selected. To simplify processing, the output frame rate of 24 frames/s which has most divisors may always be used.

In the example shown in FIG. 7, when N=0, the result is 0×24/9=0. Therefore, the frame for count 0 is an I frame. When N=1, the result 1×24/9=2.666 is rounded off to 3. Therefore, the frame for count 3 is a P frame and the intervening frames, that is frames 1 and 2, are B frames. When N=2, the result 2×24/9=5.33 is rounded off to 5. Therefore, the frame for count 5 is a P frame and the intervening frame, that is, frame 4, is a B frame. The same calculation is repeated thereafter to determine the frame type.

FIGS. 8A and 8B shows an example of B frame coding when the difference data is 0. The code begins with PSC indicating the start of the frame. The frame type code [011] specified for PCT indicates that the frame is a B frame. The frame type code [001] indicates that the frame is an I frame, while the frame type code [010] indicates that the frame is a P frame. Compressed data is described in 16×16 pixel blocks (macro blocks). MBAI indicates an increase from the preceding macro block. The first MBAI is 1. MBTYPE describes the format of a macro block. The MBP value of 0 indicates that the macro block has no data to be coded. MB ESC indicates that 33 macro blocks have no data to be coded. Two consecutive occurrences of MB ESC indicate that 66 macro blocks have no data to be coded. The following MBAI 13 indicates that another 12 macro blocks have no data to be coded and that, because MBP of the macro block is 0, the 13 macro blocks have no data to be coded. The image shown in this example is an image generated by 80 macro blocks. Because the number of macro blocks not to be coded is 1+66+13=80, all macro blocks are not coded in this example. The data amount is 2×11+135=157 bits because there are two occurrences of MB ESC.

By increasing the number of occurrences of MB ESC, it is possible to generate the code, indicating that the frame is the same as the reference frame, according to any image size. The number of occurrences of MB ESC may be calculated by the following formula:

$$(MB-MB1-MB2)/MB3 \qquad \text{Formula}$$

where, MB: Number of macro blocks of one screen
MB1: Number of macro blocks indicated by the first MBAI–MVF (1)
MB2: Maximum number of macro blocks indicated by the last MBAI–MVF (33)
MB3: Number of macro blocks indicated by one MB ESC (33) Note that the maximum number of bits of the last MBI is 11 because the code depends on the number of skipped macro blocks and that the maximum number of bits excluding MB ESC is 142.

In the above description, the video compression method according to the present invention is preferable for the world standard MPEG1. Depending upon the output frame rate and the user-specified compression level, the above embodiment is also preferable for MPEG2. Today, a need arises for video transmission, for example, over the Internet. The compressed code signals generated by the embodiment may be sent to a network for use in a wide variety of applications such as Internet television telephones or video mail.

In the above embodiment, the compressed code output unit 20 is assumed to send data to such recording media as a CD-ROM or a DVD disc. In addition to outputting the compressed code on those recording media, the output from the compressed code output unit 20 may also be used for real-time transmission.

The present invention generates a code indicating that a frame to be compressed through inter-frame compression is the same as the reference frame, thus making it possible to suit the effective frame rate to the input frame rate and to compress data efficiently in accordance with the input rate.

In addition, the ability to change the ratio of that code to other codes according to the user-specified level allows the effective frame rate to be changed according to the user specified level.

In addition, the code indicating that a frame to be compressed through inter-frame compression is the same as the reference frame requires less memory, reducing the amount of memory where compressed code is stored.

The invention may be embodied in other specific forms without departing from the spirit or essential characteristic thereof. The present embodiments is therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-147967 (Filed on May 28, 1998) including specification, claims, drawings and summary are incorporated herein by reference in its entirety.

What is claimed is:

1. A video compression method of compressing video signals, said method being processed by a frame receiving unit receiving said video signals, one frame at a time, a frame checking unit checking a type of the frame to be processed and passing control to an appropriate unit, a motion search unit searching a small block for a motion of an image, a frequency conversion unit converting the image of said small block to a spatial frequency, a quantization unit performing quantization for the image signals frequency converted by said frequency conversion unit, a reverse quantization unit performing reverse quantization for the signals output for the signals output from said reverse quantization unit, a motion compensation unit compensating a motion of the image of said small block and generating an original image, an a variable-length coding unit performing variable-length coding for the signals output from said quantization unit and outputting the signals to a compressed code output unit, said method comprising the steps of:

identifying the type of the frame by said frame checking unit that the frame is an I frame, P frame, or B frame;

passing control to the frequency conversion unit if the frame is said I frame;

passing control to the motion search unit if the frame is said P frame; passing control directly to the compressed code output unit if the frame is the B frame;

getting a frame rate of the input video image;

if said input frame rate is smaller than a predetermined maximum output frame rate, changing the predetermined maximum output frame rate to said input frame rate;

calculating an effective frame rate according to:

$$(\text{Level}-1) \times (\text{Max}-\text{Min})/(\text{Size}-1)+\text{Min}; \qquad \text{formula}$$

where, Level: User-specified compression level (an integer equal to or larger than 1);
Max: Maximum effective compression frame rate;
Min: Minimum effective compression frame rate;
Size: Maximum compression level;

selecting an output frame rate with a least common multiple with the effective frame rate from the output frame rates 23.976, 24, 25, 29.97, and 30; and outputting the image data to said compressed code output unit by calculating a frame number of the image to be compressed (beginning with 0) using the input frame rate and the output frame rate according to:

$$N \times R1/R2; \qquad \text{formula}$$

where, N: number of compressed frames compressed so far (integer value of 0 or larger);
R1: Input frame rate; and
R2: Output frame rate.

2. The video compression method according to claim 1, further comprising the steps of:

finding a number of compressed frames output to said compressed code output unit;

getting said effective frame rate;

getting said output frame rate;

checking if a count (initial of 0) of said B frames is larger than 0;

if the count is not larger than 0, calculating the number of said B frames to be used next according to:

$$(K \times R1/R2)-N-1; \qquad \text{formula}$$

where, N: number of frames compressed so far;
K: number of calculations (beginning with 1);
R1: output frame rate; and
R2: effective frame rate;

storing the number of said B frames;

checking if the number of compressed frames is a multiple of the output frame rate;

if so:
    making the frame to be compressed an I frame;
finding the number of code bytes according to:

$$(F1\times(V2/V1)\times\alpha1)/8+1 \qquad \text{formula 5}$$

where F1: average number of code bits per frame of a reference image;
V1: reference image size;
V2: current image size; and
α1: compensation value of I frame; and
allocating code memory for the code bytes; and
if not:
    making the frame to be compressed a P frame;
finding the number of code bytes according to:

$$(F1\times(V2/V1)\times\alpha2)/8+1 \qquad \text{formula}$$

where, F1: average number of code bits per frame of the reference image;
V1: reference image size;
V2: current image size; and
α2: Compensation value of P frame; and
allocating the code memory for the code bytes; and
if the count is larger than 0, making the type of the frame to be compressed a B frame;
finding the number of code bytes according to:

$$((MB-34)/33\times ESC+HEAD)/8+1 \qquad \text{formula}$$

where MB: Number of macro blocks (16×16 blocks) of a screen;
ESC: Number of MBESC code bits (11 bits); and
HEAD: Maximum number of non-MBESC code bits (142 bits); and
allocating the code memory for the code bytes.

3. The video compression method according to claim 1, wherein said compressed video is output to said compressed code output unit and said method complies with a world standard MPEG (Moving Picture Expert Group)1.

4. The video compression method according to claim 1, wherein, instead of performing said step of calculating the effective frame rate, the effective frame rate is specified by a user.

5. The video compression method according to claim 1, said step of outputting the image data is omitted if the frame is already found the B frame.

6. The video compression method according to claim 1, wherein, instead of performing said step of selecting the output frame rate with the least common multiple, the output frame rate is fixed at 24 frames/s (second).

7. A computer program product stored on a storage medium for controlling a video compressing device comprising a frame receiving unit receiving said video signals, one frame at a time, a frame checking unit checking a type of the frame to be processed and passing control to an appropriate unit, a motion search unit searching a small block for a motion of an image, a frequency conversion unit converting the image of said small block to a spatial frequency, a quantization unit performing quantization for the image signals frequency-converted by said frequency conversion unit, a reverse quantization unit performing reverse quantization for the signals output from said quantization unit, a reverse frequency conversion unit performing reverse frequency conversion for the signals output from said reverse quantization unit, a motion compensation unit compensating a motion of the image of said small block and generating an original image, and a variable-length coding unit performing variable-length coding outputting the signals to a compressed code output unit, wherein the program causes the video compression device to:

identify the type of the frame by said frame checking unit that the frame is an I frame, P frame, or B frame, pass control to the frequency conversion unit if the frame is said I frame, pass control to the motion search unit if the frame is the P frame, pass control directly to the compressed code output unit if the frame is the B frame, get a frame rate of the input video image;

get a user-specified compression level;

if said input frame rate is smaller than a predetermined maximum output frame rate, changing the predetermined maximum output frame rate to said input frame rate;

calculating an effective frame rate according to:

$$(\text{Level}-1)\times(\text{Max}-\text{Min})/(\text{Size}-1)+\text{Min}; \qquad \text{formula}$$

where, Level: User-specified compression level (an integer equal to or larger than 1);
Max: Maximum effective compression frame rate;
Min: Minimum effective compression frame rate; and
Size: Maximum compression level;

selecting an output frame rate with a least common multiple with the effective frame rate from the output frame rates 23.976, 24, 25, 29.97 and 30; and outputting the image data to said compressed code output unit by calculating a frame number of the image to be compressed (beginning with 0) using the input frame rate and the output frame rate according to:

$$N\times R1/R2 \qquad \text{formula}$$

where, N: number of compressed frames compressed so far (integer value 0 or larger);
R1: Input frame rate; and
R2: output frame rate.

8. The computer program product according to claim 7, wherein the computer program further causes the video compression device to:

find a number of compressed frames output to said compressed code output unit;

get said effective frame rate;

get said output frame rate;

check if a count (initial of 0) of said B frames is larger than 0;

if the count is not larger than 0, calculate the number of said B frames to be used next according to:

$$(K\times R1/R2)-N-1; \qquad \text{formula}$$

where, N: number of frames compressed so far;
K: number of calculations (beginning with 1);
R1: output frame rate; and
R2: effective frame rate;

store the number of said B frames;

check if the number of compressed frames is a multiple of the output frame rate;

if so:
    make the frame to be compressed an I frame;
find the number of code bytes according to:

$$(F1 \times (V2/V1) \times \alpha 1)/8 + 1; \qquad \text{formula 5}$$

where F1: average number of code bits per frame of a reference image;
V1: reference image size;
V2: current image size; and
α1: compensation value of I frame; and
allocate code memory for the code bytes; and
if not:
    make the frame to be compressed a P frame;
find the number of code bytes according to:

$$(F1 \times (V2/V1) \times \alpha 2)/8 + 1 \qquad \text{formula}$$

where, F1: average number of code bits per frame of the reference image;
V1: reference image size;
V2: current image size; and
α2: Compensation value of P frame; and
allocate the code memory for the code bytes; and
if the count is larger than 0, make the type of the frame to be compressed a B frame;
find the number of code bytes according to:

$$((MB-34)/33 \times ESC + HEAD)/8 + 1 \qquad \text{formula}$$

where MB: Number of macro blocks (16×16 blocks) of a screen;
ESC: Number of MBESC code bits (11 bits); and
HEAD: Maximum number of non-MBESC code bits (142 bits); and
allocate the code memory for the code bytes.

* * * * *